3,226,449
PROCESS FOR PREPARING PERFLUOROALKYL IODIDES
Wesley Alva Blanchard, Newcastle, and Judson Cyrus Rhode, Wilmington, Del., assignors to E. I. du Pont de Nemours and Company, Wilmington, Del., a corporation of Delaware
No Drawing. Filed June 6, 1962, Ser. No. 200,299
2 Claims. (Cl. 260—653.1)

The present invention is directed to a novel process for telomerization of perfluoroalkyl iodides with tetrafluoroethylene to obtain higher perfluoroalkyl iodides.

The thermal and photochemical telomerization of perfluoroalkyl iodides with tetrafluoroethylene to form higher perfluoroalkyl iodides is known. For example, Haszeldine, J. Chem. Soc. 1949, 2856; 1953, 3761; Nature, 167, 139 (1951), has described the thermal and photochemical telomerization process as follows:

$$R_fI + n\text{-}CF_2=CF_2 \rightarrow R_f(CF_2CF_2)_nI$$

where $R_f$ and $n$ respectively are: $CF_3$, $n=1$–10; $C_2F_5$, $n=1$–7; $n$-$C_3F_7$, $n=1$–2; $n$-$C_4F_9$, $n=1$–2; $n$-$C_5F_{11}$, $n=1$ and greater. These thermal and photochemical processes have distinct disadvantages of being time-consuming and tedious. Also, these thermal and photochemical processes offer rather poor control of product composition and low productivity of reaction equipment. While the 1:1 addition product can usually be produced by these processes in relatively high yield, higher telomers are obtained by these processes either in poor yield and conversion or a very wide range of products is obtained. Thus, if a particular range of telomers is desired by the known thermal and photochemical processes, it can be obtained only in relatively low yield along with considerable quantities of undesired and less useful products. Since both perfluoroalkyl iodides and tetrafluoroethylene are relatively expensive as commercial chemicals go, it is economically undesirable to use processes which give poor utilization of these materials in forming useful products.

It is, therefore, an object of this invention to provide a novel telomerization process capable of giving high yields of a desired range of telomers.

It is a further object to provide a novel process for telomerization of perfluoroalkyl iodide with tetrafluoroethylene which is convenient to operate, and which uses conventional equipment at high production rates.

These and other objects will become apparent from the following description and claims.

It has now been found that the telomerization of perfluoroalkyl iodides with tetrafluoroethylene in the presence of certain free radical generating catalysts is capable of high production rates and leads to good yields of relatively narrow ranges of telomers.

More specifically, the present invention is directed to a process for preparing perfluoroalkyl iodides containing from six to twelve carbon atoms which comprises injecting gradually during the reaction cycle a quantity of tetrafluoroethylene and a free radical generating catalyst into a mixture containing initially (1) a perfluoroalkyl iodide chosen from perfluoroethyl iodide and mixtures of perfluoroethyl iodide and n-perfluorobutyl iodide and (2) a portion of free radical generating catalyst, said mixture heated at from 80° to 170° C. and under pressure of from about 225 to about 700 p.s.i., said injecting continued until from about 0.25 to about 1.2 moles of tetrafluoroethylene per mole of perfluoroalkyl iodide and from about 0.25% to about 0.9% by weight of the free radical generating catalyst per total weight of the reaction mixture have been added, and recovering from the reaction mixture products of structure $F(CF_2)_mI$, wherein $m$ is from six to twelve.

The present process consists of reacting perfluoroethyl iodide or mixtures of perfluoroethyl iodide and n-perfluorobutyl iodide with tetrafluoroethylene and obtaining products of structure $F(CF_2)_mI$ containing from six to twelve carbons. These products are produced in yields of better than 70% by this process.

Any free radical generating catalyst which has a useful decomposition rate within the range of 80–170° C. may be used. Examples of useful catalysts are ketone peroxides such as methyl amyl ketone peroxide, di-tert-alkyl peroxides such as di-tert-butyl peroxide, alkyl azo compounds such as $\alpha,\alpha'$-azobis(isobutyronitrile), $\alpha,\alpha'$-azobis($\alpha,\gamma$-dimethylvaleronitrile) and perfluoroazomethane, aromatic diacyl peroxides such as benzoyl peroxide and the like. The preferred free radical generating catalyst is di-tert-butyl peroxide. Inorganic peroxides such as potassium persulfate are generally not useful due to their insolubility in the reaction mixture.

The reaction temperature depends primarily on the catalyst used. The ketone peroxides, the azo compounds and the aromatic diacyl peroxides are generally used in the range of 80–120° C., while the di-tert-alkyl peroxides such as di-tert-butyl peroxide require 120–170° C. reaction temperatures. The preferred reaction temperature, with the preferred catalyst, is about 165° C. Temperature causes an undesirable yield loss when it exceeds 170° C. The main function of temperature is to control the rate of decomposition of the free radical generating catalyst. The present reaction is somewhat exothermic and should rapid initiation occur, control of the temperature and control of the reaction become difficult. Several reactions which are difficult to control and which are hazardous occur when tetrafluoroethylene is heated above about 250° C. under pressure.

The mole ratio of tetrafluoroethylene to perfluoroalkyl iodide may vary from about 0.25 to about 1.2. Ratios higher than 1.2 cause excessive yield losses due to formation of reaction products where $m$ is greater than 12. The ratio also has an effect on the composition of the product. The preferred mole ratio is from 0.4 to 1.1, depending on conditions and whether recycle material is being used.

The total weight of free radical generating catalyst added to the reaction mixture may vary from about 0.25% to about 0.9% by weight of the reaction mixture. The concentration of catalyst present at any time, as well as the total amount of catalyst used, should be kept as low as possible consistent with a desirable reaction rate. Excessive initiating agent (greater than 0.9% by weight total) has an undesired effect on yield, causing by-product formation.

The reaction pressure may be varied from about 225 p.s.i. to about 700 p.s.i. The actual pressure will depend on the reaction temperature and the concentration of tetrafluoroethylene. In the present process, the perfluoroalkyl iodide and a portion of the free radical generating catalyst (generally less than one-half of the total catalyst to be used) are placed in a pressure vessel and heated, usually with agitation. Tetrafluoroethylene and further catalyst are added to the mixture until the desired amount of each has been added. Heating is then continued until the tetrafluoroethylene has been consumed but no further, since excessive heating also can cause by-product formation. The initial reaction pressure will vary with the temperature and other reaction conditions, but usually does not exceed about 450–600 p.s.i. The final pressure will generally be about 200–300 p.s.i. The rate of addition of tetrafluoroethylene and catalyst will depend on such factors as the rate of consumption of these materials and the ability of the reaction vessel for removing heat from the reaction mixture. It has been found that the time taken for the addition may vary from one-half to about two hours depending on these factors. The heating time required after the addition is complete is usually rather short. Over-all, reaction times of from one to two hours are the general rule.

Tetrafluoroethylene is added over the period of the reaction for two reasons: first, because if added all at once it generally leads to high pressures, and second, if added all at once it seems to have an effect on the composition and yield of the desired product. The catalyst is added over the period of reaction because it allows better control of the reaction and because the presence of excess catalyst can lead to larger amounts of by-products.

Conversion of tetrafluoroethylene is essentially complete. Conversion of the perfluoroalkyl iodides, since they are often used in some excess, particularly under the preferred conditions, is incomplete. However, with recycle, complete conversion of the perfluoroalkyl iodides is obtained.

The perfluoroalkyl iodides are well known to the art. Although it is preferred to use perfluoroethyl iodide, mixtures of perfluoroethyl iodide and n-perfluorobutyl iodide may also be used. In commercial practice, n-perfluorobutyl iodide will usually result from recycle of products containing less than six carbon atoms. Mixtures of perfluoroalkyl iodides require slight modification of reaction conditions, for instance, less tetrafluoroethylene.

The best source of perfluoroethyl iodide seems to be the reaction of tetrafluoroethylene with a mixture of iodine and iodine pentafluoride in the presence of an aluminum-aluminum iodide catalyst, as described by Hauptschein et al. in J. Amer. Chem. Soc. 83, 2383 (1961), U.S. Patent 3,006,973 (Oct. 31, 1961) and Belgium Patent 594,145 (Aug. 17, 1960). Of course, other, more expensive methods are known for preparing this material.

Tetrafluoroethylene is a commercial material. It is usually stored containing d-limonene inhibitor. While it is often desirable to remove the inhibitor before use in free radical initiated reactions and can be done in the subject invention if desired, it is unnecessary to do so in the present process. This is a distinct advantage since it removes one source of potential hazard.

The products of the present invention have the structure $F(CF_2)I$. The value of $m$ is from six to twelve. The range of reaction conditions described produce the best yields of products containing six to twelve carbons. Products containing less than six carbons are formed, but they are recycled by combining with perfluoroethyl iodide for further reaction with tetrafluoroethylene. As noted earlier, the composition of the product varies with the reactant mole ratio of tetrafluoroethylene to perfluoroalkyl iodide. As the ratio increases, so does the relative amount of products containing more than twelve carbons. As the value of the ratio decreases, the relative amount of product containing less than six carbons (which must be recycled) increases also. Since a large recycle is undesirable, the range of mole ratios cited is also critical in limiting this factor. The surprising feature of this invention is that a mole ratio range exists which not only limits the amounts of products containing more than twelve carbons but also the amount of products containing less than six carbons. The present process limits the amount of product containing more than twelve carbons and other by-products to less than 30%. Hence, the yields of useful products are in excess of 70% and usually nearer 90%.

The major by-products of the present process, in addition to those iodides containing more than twelve carbons, are $F(CF_2)_mH$, apparently produced by the reaction of intermediate radicals with the catalyst or catalyst fragments by hydrogen abstraction. (Of course, such products are not formed when perfluoroazomethane is used as the catalyst.) The yield of these by-products increases with the amount of catalyst and catalyst fragments present. Smaller amounts of other, unidentified materials may also occur but they are readily separated from the desired products. These unidentified materials are also quite inert and can be allowed to remain in the product, if so desired, since they will not enter into any of the reactions in which the product iodides may be used.

The product iodides $F(CF_2)_mI$ may be separated from the reactants and by-products by any conventional means, for instance by fractional distillation. The product may also be recovered in sufficient purity for most purposes by stripping off the unreacted starting materials and recovering the product as still residue. The principal use of the products of this invention is as intermediates for preparing oil and water repellents for textiles and the like. To obtain oil and water repellents from the subject iodide products, a minimum range of six to twelve carbons is necessary. While iodides with more than twelve carbons may be used, they are more expensive since they contain more fluorine with no benefit derived therefrom. Hence it is desirable to produce iodides which contain near the minimum required and no more. The present process does this. One method for preparing oil and water repellents for textiles is via the following series of reactions:

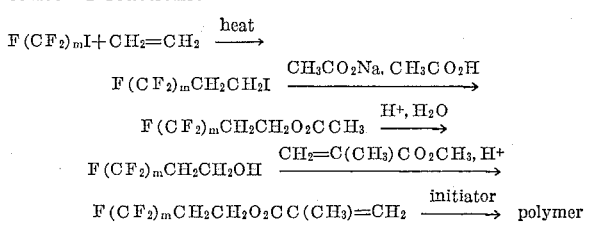

Methyl acrylate, when used in place of methyl methacrylate above, gives the corresponding acrylate polymers. If a comonomer is used in the above polymerization step, copolymers are obtained which are also useful as oil repellents for textiles.

Other uses for the perfluoroalkyl iodide products of this invention include conversion of the perfluoroalkyl iodides to the corresponding acids by way of reacting the perfluoroalkyl iodide with acetylene to form the 1-perfluoroalkyl-2-iodoethylene, which is in turn oxidized to form the desired perfluoroalkyl carboxylic acid. The perfluoroacids are useful as surface active agents. Their acid chlorides may be converted to other surface active agents such as those described in U.S. Patent 2,764,602 and for perfluoroalkylating aromatic compounds as described in U.S. Patent 2,957,031. The perfluoroalkyl iodides may also be used to perfluoroalkylate aromatic compounds as described in British Patent 840,725.

It should be particularly understood that, while the present process is defined for certain perfluoroalkyl iodide reactants, it could equally well be applied to other perfluoroalkyl iodides if so desired. A different range of products would naturally be obtained by changing reaction conditions while still remaining within the heretofore described scope of the invention. The limitations on desired product size in the definition of the invention are based on utility as heretofore pointed out and are not based on limitations of the process itself. It is not to be assumed, however, that the process as defined is equally well applicable to olefins other than tetrafluoroethylene or to fluoroalkyl iodides other than perfluoroalkyl iodides. The reaction conditions outlined earlier are applicable only to the combination of tetrafluoroethylene and perfluoroethyl iodide or mixtures of perfluoroethyl and perfluorobutyl iodides to produce the results described. For example, if the present process is applied to tetrafluoroethylene and $CF_2ClCFClH$, the 1:1 adduct $$CF_2ClCFClCF_2CF_2I$$

is obtained as the primary product and little or no other reaction products are formed.

The following examples are representative and illustrate the present invention and show preferred embodiments thereof. The object of all of the following illustrative examples is to prepare n-perfluoroalkyl iodides containing from six to twelve carbons. All parts are by weight unless stated otherwise.

Table

| Example | Parts $C_2F_5I$ | $C_4F_9I$ | Catalyst | Total Catalyst used, wt. percent | Temp., °C. | Time, min. | Ratio of $C_2F_4$ added to initial iodide moles | Percent yield: $C_6F_{13}I$–$C_{12}F_{25}I$ | |
|---|---|---|---|---|---|---|---|---|---|
| | | | | | | | | Based on $C_2F_4$ | Based on iodide |
| 2 | 800 | 800 | Ditertiary butyl peroxide. | 0.9 | 165 | 60 | 0.654 | 93.9 | 74.5 |
| 3 | 1,200 | 400 | ___do___ | 0.89 | 165 | 60 | 0.961 | 98 | 80.1 |
| 4 | 1,200 | 400 | ___do___ | 0.78 | 165 | 60 | 0.67 | 98+ | 73.6 |
| 5 | 1,200 | 400 | ___do___ | 0.85 | 165 | 60 | 0.767 | 90.7 | 81.9 |
| 6 | 1,200 | 400 | ___do___ | 0.91 | 165 | 60 | 0.86 | | 60 |
| 7 | 1,200 | 400 | ___do___ | 0.78 | 175 | 60 | 1.2 | 65 | 65 |

EXAMPLE 1

A stainless-steel autoclave of 1500 parts water capacity was charged with 1200 parts of perfluoroethyl iodide and 400 parts of perfluorobutyl iodide and heated to 116° C. An initiator solution (30.3 parts) containing 20% by weight di-tert-butyl peroxide in perfluorobutyl iodide was quickly added to the autoclave. The autoclave was then quickly heated to 165° C. and tetrafluoroethylene was added at the rate of six parts per minute while initiator was added at the rate of 0.83 part solution per minute. The initial reaction pressure was 440 p.s.i.g., which decreased during the course of the reaction to 285 p.s.i.g. After one hour, 402 parts of tetrafluoroethylene and 89.3 parts of initiator solution had been added (final ratio of added $C_2F_4$ to initial iodide=0.86, total catalyst used=0.78 wt. percent). The reaction mixture was cooled and the product (2107 parts, 100%) was discharged into receivers cooled to −50° C. The crude product was analyzed by vapor phase chromatography with the following results.

| Component: | Weight-percent |
|---|---|
| $C_2F_5I$ | 35.9 |
| $F(CF_2)_4I$ | 19.7 |
| $F(CF_2)_6I$ | 15.1 |
| $F(CF_2)_8I$ | 11.6 |
| $F(CF_2)_{10}I$ | 7.2 |
| $F(CF_2)_{12}I$ | 3.7 |
| Others | 6.8 |

These results indicate that the apparent conversion of perfluoroethyl iodide was about 37%, the apparent conversion of perfluorobutyl iodide was about 12%, the yield of $F(CF_2)_mI$, where $m=6-12$, was 76.3% based on perfluoroalkyl iodide converted and 92.6% based on tetrafluoroethylene which was completely converted. Distillation gave the following typical results.

| Component: | Boiling point |
|---|---|
| $C_2F_5I$ | 12–15°/760 |
| $F(CF_2)_4I$ | 60–71°/760 |
| $F(CF_2)_6I$ | 50–59°/98 |
| $F(CF_2)_8I$ | 75–90°/50 |
| $F(CF_2)_{10}I$ | 105–125°/50 |

When the process above is repeated using 1600 parts of perfluoroethyl iodide in place of the mixture of iodides used above, the conversion of perfluoroethyl iodide was about 50% and the yields are approximately the same as the above case.

Repeating this example using the same amount of a 20% by weight solution of α,α'-azobisisobutyronitrile in perfluorobutyl iodide and a reaction temperature of 80–90° C. gave essentially the same results.

The following examples shown in the table below were carried out in the same manner as described above under the conditions shown in the table. The results are shown in the table.

To illustrate the present invention, a comparison test was carried out using the prior art thermal process hereinbefore described.

A mixture of 800 parts of perfluoroethyl iodide (3.25 moles) and 800 parts of n-perfluorobutyl iodide (2.31 moles) was heated to 194° C. in an autoclave and about 50 parts of tetrafluoroethylene was added. The temperature rose to 218° C. and the pressure rose to 60 p.s.i. from 450 p.s.i. When the temperature and pressure had decreasde, further tetrafluoroethylene was again added and the process repeated until a total of 192 parts (1.92 moles) had been added (mole ratio of tetrafluoroethylene added to the initial perfluoroalkyl iodide=0.345). The maximum pressure observed was about 800 p.s.i.

Vapor phase chromatographic analysis of the crude product gave the following results.

| Compound: | Weight-percent |
|---|---|
| $C_2F_5I$ | 36.2 |
| $F(CF_2)_4I$ | 37.9 |
| $F(CF_2)_6I$ | 11.4 |
| $F(CF_2)_8I$ | 4.4 |
| $F(CF_2)_{10}I$ | 1.7 |
| $F(CF_2)_{12}I$ | 0.6 |
| Others | 7.8 |

This analysis indicates an apparent conversion of perfluoroethyl iodide of 18.9%, an apparent conversion of perfluorobutyl iodide of 15%, a yield of $C(CF_2)_mI$, $m=6-12$, of 69.2% based on perfluoroalkyl iodide converted and a yield of 61.8% based on tetrafluoroethylene converted.

The ratio of tetrafluoroethylene to perfluoroalkyl iodide of the above thermal process is within the range of Examples 1–5. However, because it is a thermal process, the temperature is much higher than Examples 1–5. In comparing the above test illustrating the art recognized thermal process with the present invention, it will be noted that the yields of perfluoroalkyl iodides containing from 6 to 12 carbon atoms is much lower in the thermal process than in the process of the present invention hereinbefore described in Examples 1–5.

There are several particular advantages of the present process over the thermal and photochemical processes. First, the process of the present invention is capable of producing a desired range of perfluoroalkyl iodide products in high yield. Second, the yields are far better than the thermal and photochemical processes for the desired range of products. Third, the process is less hazardous especially when compared with the thermal process. Fourth, no unusual equipment is required, particularly when compared with the photochemical process. Fifth, the prent invention is less expensive than the photochemical process, since the photochemical process is very expensive to operate due to the electrical power consumed by the light source (the efficiency of utilization in the reaction of light energy is usually poor). Sixth, the present process is considerably more rapid than either the photochemical or thermal processes. The present process usually requires one to two hours, whereas the thermal process requires a large number of hours and the photochemical process times can be measured in days. Thus, the present process allows considerably higher productivity which lowers both investment and labor costs, both important commercial considerations. For the above reasons, this process is a valuable addition to the art.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing perfluoroalkyl iodides containing from six to twelve carbon atoms which process comprises reacting tetrafluoroethylene with a perfluoroalkyl iodide selected from the group consisting of perfluoroethyl iodide and mixtures of perfluoroethyl iodide and n-perfluorobutyl iodide in the presence of an organic free radical generating catalyst at a temperature of from 80° C. to 170° C. and under a pressure from about 225 p.s.i. to about 700 p.s.i., said tetrafluoroethylene and a portion of the free radical generating catalyst being injected gradually during the reaction to said perfluoroalkyl iodide containing a portion of said free radical generating catalyst until from about 0.25 to about 1.2 moles of tetrafluoroethylene per mole of perfluoroalkyl iodide and from about 0.25% to 0.9% by weight of free radical generating catalyst per total weight of reaction mixture have been added, and recovering from the reaction mixture products having the structure $(F(CF_2)_mI$, wherein $m$ is from six to twelve.

2. A process for preparing perfluoroalkyl iodides containing from six to twelve carbon atoms which process comprises reacting tetrafluoroethylene with perfluoroethyl iodide in the presence of di-tert-butyl peroxide catalyst at a temperature of from 120° C. to 170° C. and under a pressure from about 225 p.s.i. to about 700 p.s.i., said tetrafluoroethylene and a portion of the total amount of di-tert-butyl peroxide being injected gradually during the reaction to said perfluoroalkyl iodide containing the remaining portion of said di-tert-butyl peroxide until from about 0.4 to about 1.1 moles of tetrafluoroethylene per mole of perfluoroethyl iodide and from about 0.25% to 0.9% by weight of di-tert-butyl peroxide per total weight of reaction mixture have been added, and recovering from the reaction mixture products having the structure $F(CF_2)_mI$, wherein $m$ is from six to twelve.

References Cited by the Examiner

UNITED STATES PATENTS 2,562,547   7/1951   Hanford et al. _____ 260—653.1

FOREIGN PATENTS 949,822   9/1956   Germany.

OTHER REFERENCES

Haszeldine: J. Chem. Soc. (London), 1949, pp. 2856–61.

Haszeldine: Nature, 167, pp. 139–40–40 (1951).

LEON ZITVER, *Primary Examiner.*